Sept. 26, 1950  C. C. SACHS  2,523,524
WALL PANEL FORMING MACHINE
Filed Aug. 15, 1947   4 Sheets-Sheet 1
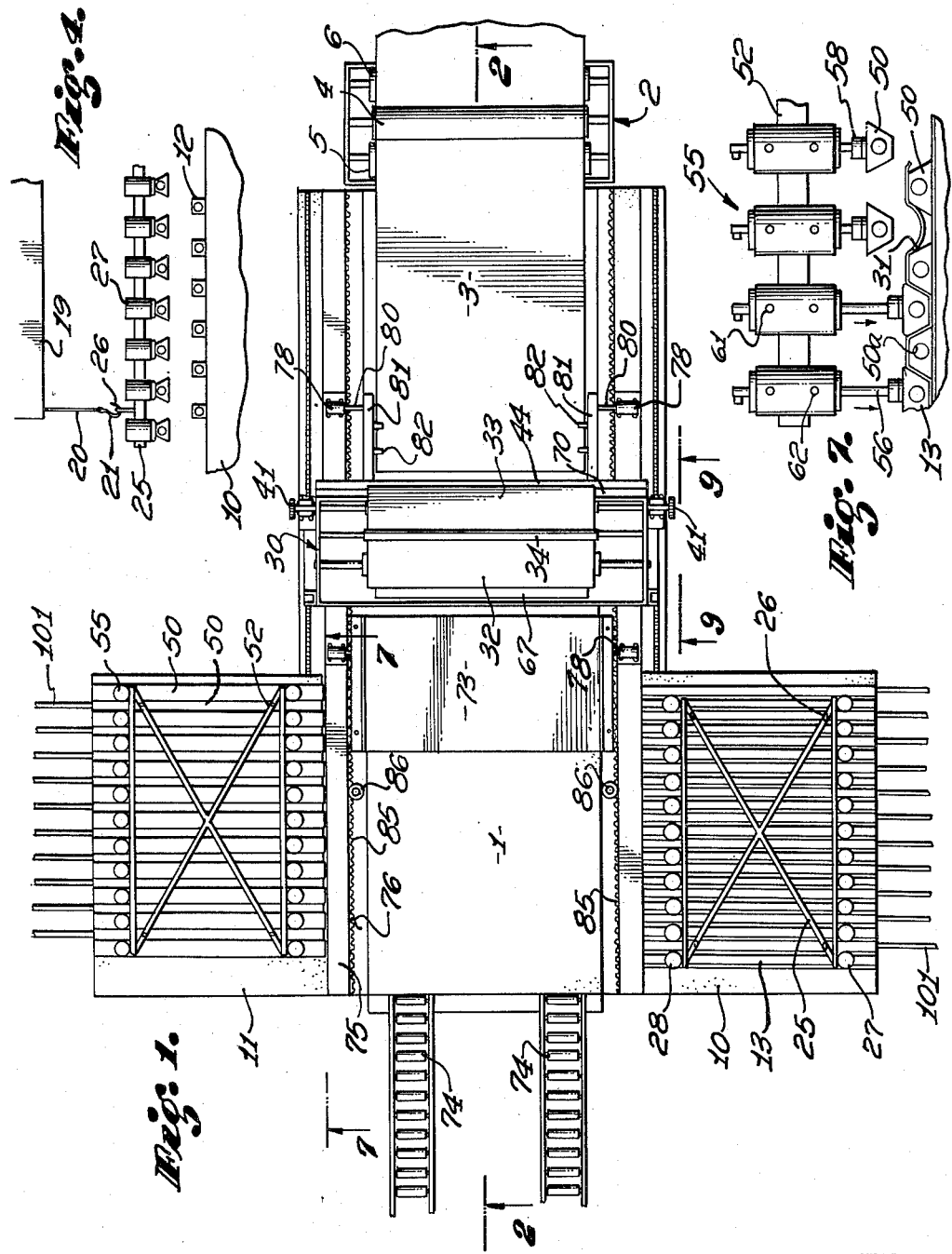
INVENTOR:
CARROL C. SACHS
BY O. O. Martin,
ATTORNEY.

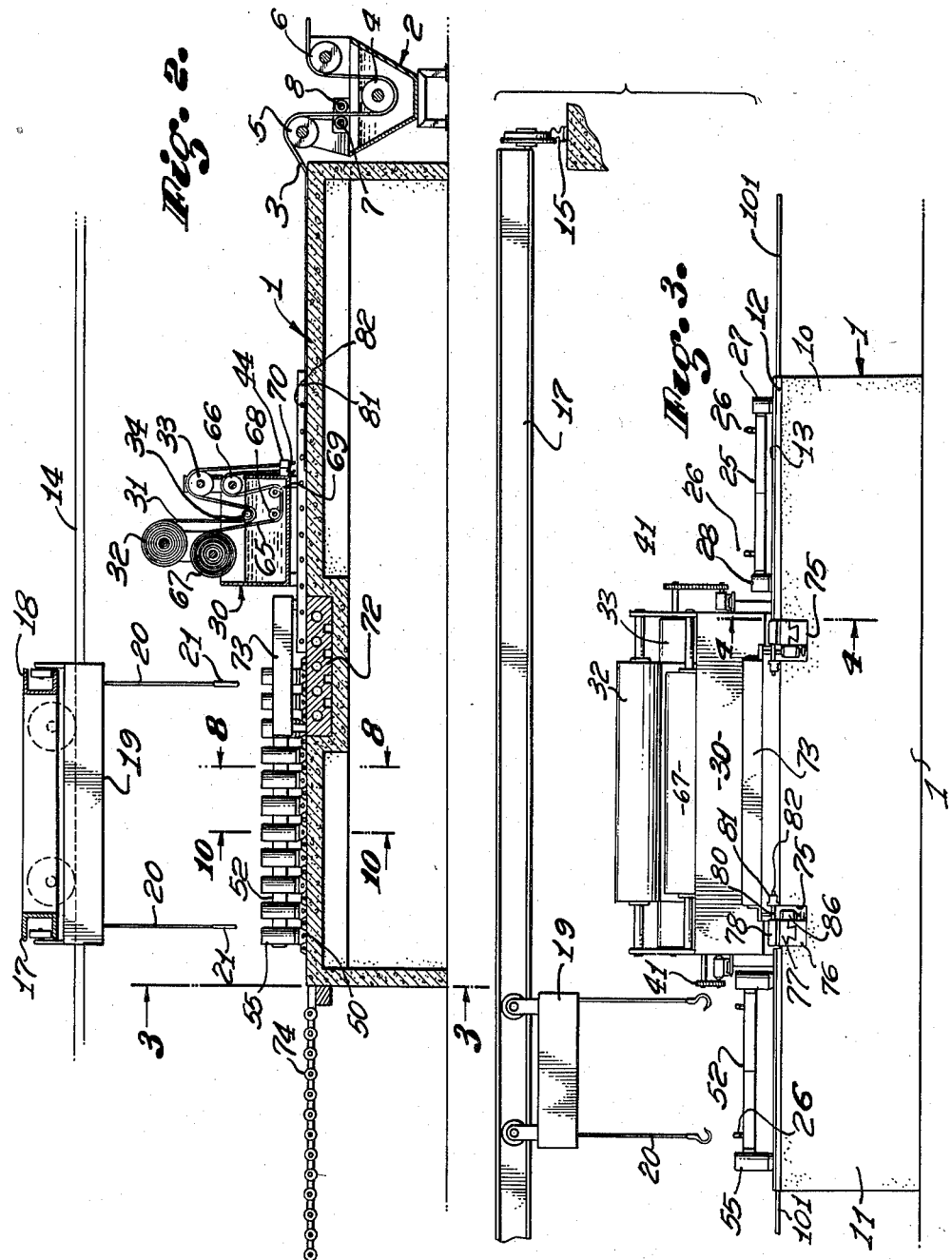

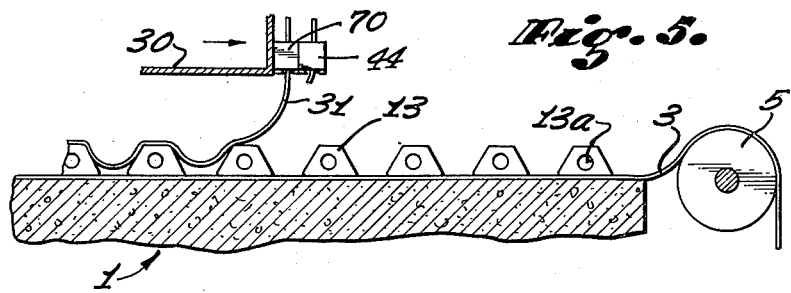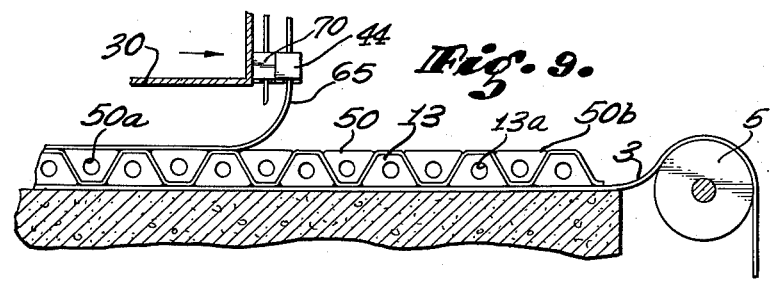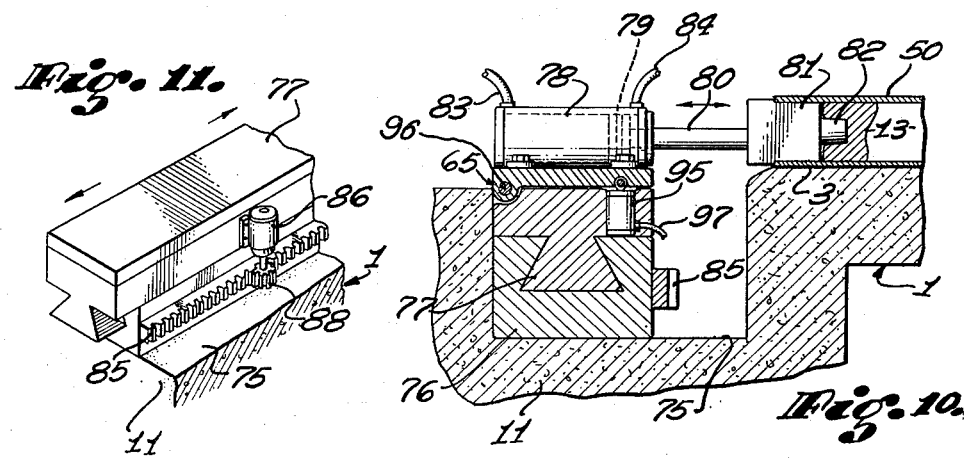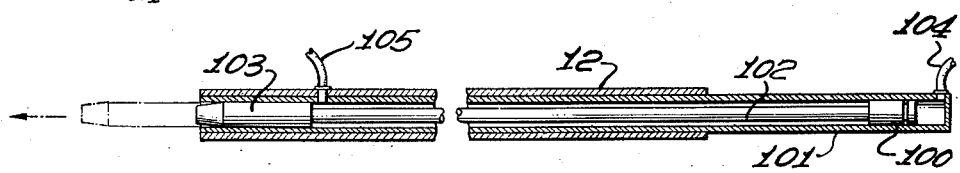

Sept. 26, 1950     C. C. SACHS     2,523,524
WALL PANEL FORMING MACHINE
Filed Aug. 15, 1947     4 Sheets-Sheet 4
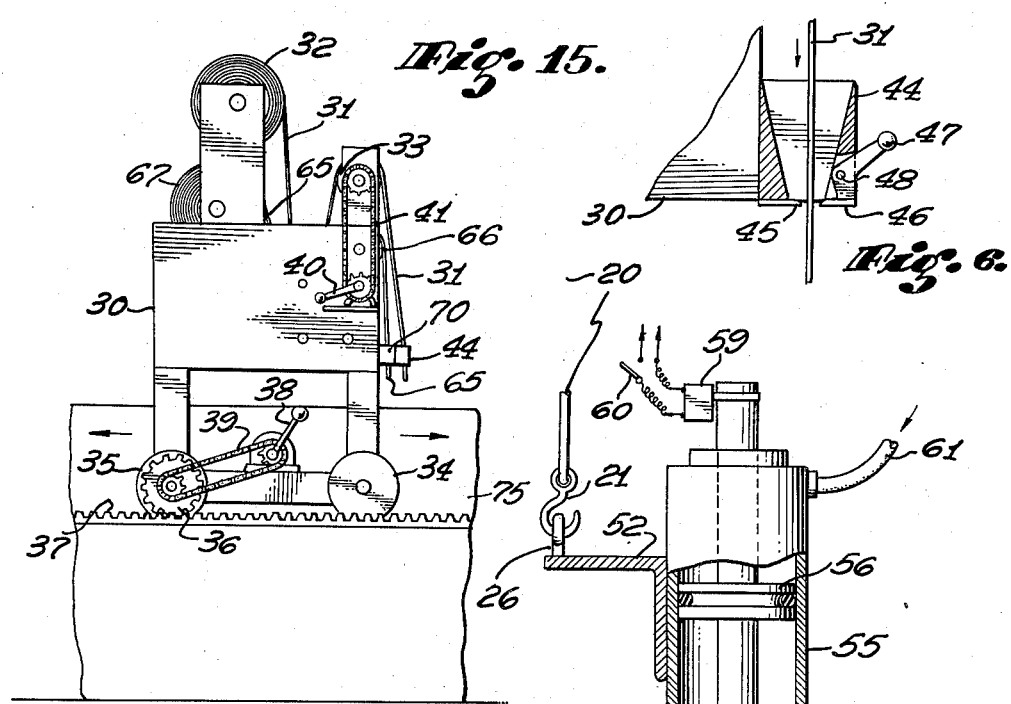
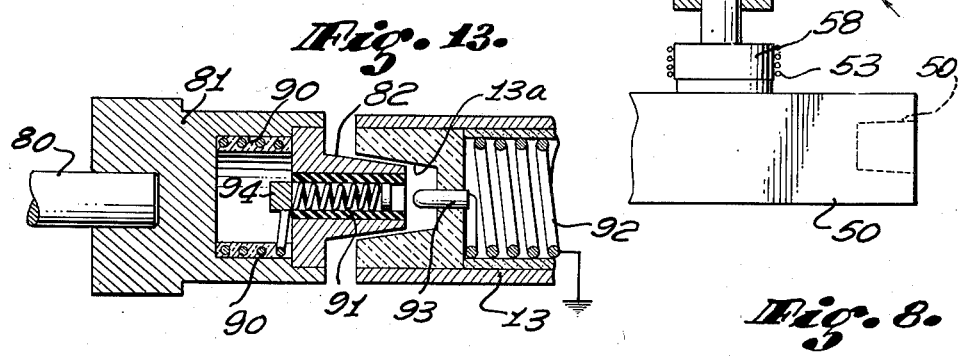
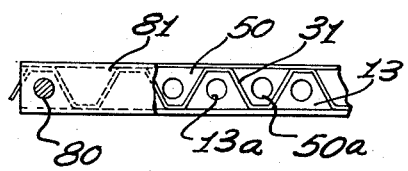
INVENTOR:
CARROL C. SACHS
BY
O. O. Martin
ATTORNEY.

Patented Sept. 26, 1950

2,523,524

UNITED STATES PATENT OFFICE 2,523,524

WALL PANEL FORMING MACHINE

Carrol C. Sachs, North Hollywood, Calif., assignor to Alexander H. Kerr & Co., Inc., Los Angeles, Calif.

Application August 15, 1947, Serial No. 768,777

16 Claims. (Cl. 154—1)

This invention has relation to a machine for producing structural units, such as wall panels, and has for its object to provide a device for assembling and combining webs of material into a structural unit of load carrying capacity.

More particularly it is the object of my invention to provide a device including means for impregnating webs of material with a resin capable of polymerization under the influence of heat to produce an integral structural unit.

A further object is to introduce between the impregnated webs passing through the machine means for so arranging and shaping the webs that a cellular structure of a particular form is produced.

These and other objects of the invention will be better understood from the following detailed description of a preferred form of the invention and by referring to the accompanying drawings, of which:

Fig. 1 is a plan view of a device embodying the invention;

Fig. 2 is a side elevational view substantially through the center of Fig. 1, in the direction of the arrows 2;

Fig. 3 is an end view of the device taken in the direction of arrows 3 of Fig. 2;

Fig. 4 is a fragmentary detail view showing means for guiding elements of the device;

Fig. 5 shows these elements positioned on a newly formed web of material and receiving a second web of material;

Fig. 6 shows certain guide and cutting means hereinafter fully described;

Figs. 7, 8 and 9 are fragmentary views illustrating my method of placing and guiding additional webs of material as they are progressively fed into the machine;

Figs. 10 and 11 are fragmentary views illustrating means for correctly placing and moving the webs through the machine;

Fig. 12 is a fragmentary end view of a portion of an assembled web structure;

Fig. 13 illustrates preferred means for heating the assembled webs by polymerization to form the webs into an integral structure;

Fig. 14 illustrates means of removing the guides from the finished product; and

Fig. 15 is an enlarged side elevational view of the impregnating device shown in Figs. 1 and 2 of the drawings.

The device of my invention is mostly mounted and operable on a platform 1, at one end of which is placed a reservoir 2 containing the liquid resin with which a web material is impregnated to form one of the outer layers 3 of a structural unit such as described in my copending application, Serial No. 736,575, filed March 22, 1947.

Illustrative of simple means of feeding the web through the reservoir, I have shown a roller 4 mounted for rotation therein and additional rollers 5 and 6 are placed above the reservoir. Rotation of the roller 5 in counter-clockwise direction will cause the web to be drawn through the liquid and to be delivered on the platform 1. In order to remove excess accumulation of resin from the web, it may be found advisable to pass the web between a pair of wringer rollers 7, 8, such as commonly used in washing machines.

From the main portion of the platform extend laterally wings 10, 11 to form supports for mandrels which are used during the process of forming the unit as well as mechanisms for transporting and placing these mandrels in proper positions relative to the webs. To the top of the extension 10 is rigidly secured a series of parallel, equidistantly spaced transverse guide bars 12, between each adjacent pair of which space is provided to receive and to hold a series of mandrels 13 in correct positions relative to each other; see Fig. 4.

On a track 14, 15, above and parallel with the platform, is mounted a traveling crane including parallel transverse beams 17, 18 which form a track for a wheel carriage 19. The carriage is equipped with propelling and hoisting mechanism such as ordinarily employed in overhead traveling cranes. Hoisting cables or chains 20 extend from this mechanism and they are shown fitted with grapples or hooks 21 for the purpose of the invention, as will now be described in detail.

In a frame 25 are mounted attaching elements, such as eye bolts 26, to which the hooks 21 are attachable. Two rows of magnets 27, 28 are secured to the side edges of the frame 25 and they are energized when the frame, carried by the crane, is brought into registration with the mandrels to raise the mandrels away from the guide bars. The crane is now manipulated to move the mandrels to a position directly above the web 3, whereupon the magnets are switched off and the mandrels brought to rest on the web.

It is to be understood that means should be provided properly to align the mandrels on the web both longitudinally and transversely thereof and such devices will hereinafter be more fully described. It is, of course, also necessary to provide electrical connections to the magnets and switches for controlling the currents therethrough, but as such devices are commonly known and do not modify the combinations and features claimed as the present invention, they are not illustrated in the drawings.

On a track along the side edges of the platform is mounted a tank 30 as best shown in Fig. 15, which, like the reservoir 2, contains a liquid resin through which a web 31 is drawn from a reel 32 upon rotation of a roller 33. A guide roller 34 is placed within the tank to insure proper advance movement of the web through the resin within the tank.

The tank is mounted on wheels 35 and a gear wheel 36 is secured to one of the wheel axles to mesh with a rack 37 which is secured to the top of the platform. The tank 30 is movable along the platform by means of a hand crank 38, or otherwise, and a sprocket connection 39 extends therefrom to the shaft of the roller 35 for the purpose of effecting the tank movements. As best shown in Fig. 5, the tank is now slowly moved to the right to deposit the web 31 over and into the spaces between the mandrels 13 which, as above mentioned, have been deposited on the web 3. During this forward movement of the tank, the web is advanced through the liquid resin at the proper speed to allow time for the web to sink into the spaces between the mandrels. The roller 33 is suitably rotated, as by means of a hand crank 40 and sprocket connections 41 from this crank to the shaft of the roller 33.

The web 31 is, during its advancement to the mandrels, guided within a suitable frame 44, see Fig. 6, the bottom of which is shaped to form a cutoff mechanism for the web when the latter reaches a predetermined position beyond the last mandrel 13a. Illustrative of such cutoff mechanism, I have shown a stationary cutting bar 45 secured to the bottom surface of the guide 44 and a movable cutting bar 46, which is part of a lever 47, and the latter is pivotally hung on a stud 48. Pressure against the end of this lever, or perhaps a quick blow by hand, will suffice to separate the soft web.

It should be stated that the crane has been moved, before the advance movement of the tank 30 began, to carry the frame 25 away from the web 3 and temporarily to deposit this frame at any suitable place.

A second set of mandrels 50 have been deposited on the platform extension 11 and they are maintained in proper alignment thereon by means of stationary guides 51, as best shown in Fig. 1. A frame 52, which may be very similar to the frame 25, is shown fitted with mandrel operating elements which, as shown in Fig. 7, have come to rest on the upper surface of the mandrels. It is important to note that these mandrels, the cross sectional shape of which may be very similar to or identical with the mandrels 13, are in this case turned upside down.

Referring now to Fig. 8, it is noticed that each of the mandrel operating elements comprises a cylinder 55 which is rigidly secured to the frame 52 in any suitable manner and that a piston 56 is mounted within this cylinder. A piston rod 57 extends through the cylinder casing and is at the bottom fitted with a shoe 58 about which a magnetic coil 53 is wound. When this coil is energized, in any conventional manner, it is found that the shoe will attract the mandrel positioned directly below the shoe. The hooks 21 of the crane cables may be attached to the frame 52, substantially as indicated in Fig. 8, when all the mandrels have been raised to the shoes, whereupon the crane is operated to lift the frame carrying the mandrels along with it and to move the frame to the position shown in Fig. 9 of the drawings directly above the mandrels 13 deposited on the web 3 and the web 31 which, as just described, has been deposited thereon, care being taken that the mandrels 50 enter the spaces between the mandrels 13 as the frame is lowered to seat the mandrels 50 in this manner. Once the mandrels are seated therein, the shoes are demagnetized.

It is noticed that a tube 61 is cut into the cylinder above the piston 56 and this tube is connected to receive pressure fluid from a convenient source (not shown). The pressure fluid entering the cylinder through this tube will depress the piston 56 and cause the shoe 58 of the piston rod to press the mandrel downward into the space between the mandrels 13. The web being still soft will, in this manner, be pressed into the shape of the grooves between the mandrels 13, substantially as indicated in Fig. 9. In doing this, it is important to note that the mandrels are consecutively depressed beginning with the mandrel 50a, of Fig. 9, and continuing until the last mandrel 50b has been depressed. When the mandrels are in this manner depressed one by one, it is seen that the web, if it has not quite sunk into the spaces between the mandrels 13 to reach the bottom corners thereof, is capable of slight longitudinal adjustment as the tank and the web issuing therefrom move forward.

Devices should be embodied for advancing the shoes 58 consecutively, as above stated, and such devices may take the form of any conventional type of sequence switch mechanism which is attached to the upper end of the piston rod, as indicated at 59, in Fig. 8. When the switch 60, on the rod above the mandrel 50a, has been closed to cause pressure fluid to enter the cylinder thereby to advance the piston and the shoe thereof and so to press the mandrel 50a into the space between the mandrels 13, it is found that switch mechanism 59 automatically functions to retract the shoe and to cause the pressure fluid to advance the piston and shoe of the next following cylinder. The mandrels 50 are in this manner consecutively depressed.

The tank, which had been returned to the position of Fig. 2 before the frame 52 was moved to deposit the mandrels 50, will now again be advanced to cause a third web 65 to be deposited on top of the mandrel assembly on the platform. The feeding mechanism for this third web is shown to comprise a roller 66 which draws the web from a reel 67 around guide roller 68, 69 and over the roller 66 through a guide 70, which is very similar to the above described guide 44, and which at the bottom thereof in like manner is fitted with a cutoff mechanism.

The portion of the building unit which has in this manner been formed is now moved along the platform, by means of mechanism which will be described presently, into the central portion thereof where a heating element 72 is recessed into the platform flush with the top surface thereof. A second heating element 73 is then placed on top of the unit directly above the element 72, and these elements are electrically heated to cause the three layers of the construction unit to become cured by a process of polymerization and to harden. The unit is then again moved until it passes beyond the heating units and finally is delivered to a table composed of a series of rollers 74, along which the unit advances intermittently as the assembling and curing of the unit progresses in the manner above described. It was above stated that the web 3 is drawn out of the reservoir 2 by means of the roller 5. This, however, may only be necessary in the first instance since the unit as it advances through the machine will automatically continue the withdrawal movement of the web out of the reservoir.

During the various operations, it is absolutely essential that all of the mandrels at all times are maintained correctly positioned relative to each other. It is also necessary to retain the parts in such correct relative positions during the movement of the unit into and out of the heating elements. For the purpose of this arrangement, I have shown a groove 75 cut into the edge of the platform. Only one side thereof is indicated in Fig. 10, and I wish it understood that an identical grove is provided along the other side edge thereof. As these grooves and the mechanisms placed therein may be substantially or exactly alike, it is to be understood that the description of one of them pertains equally to the other. A bar 76 is rigidly mounted within the groove 75 to form a track for a rail member 77 which latter is dovetailed thereinto or otherwise fitted for a lengthwise movement therealong in fixed relation relative thereto. To the top of this rail member is pivotally secured a plate 65 on which is mounted two or more cylinders 78 having pistons 79 seated for lengthwise sliding movement therein and provided with piston rods 80 the ends of which are seated in recesses of a bar 81. The latter forms a continuous flange which comes to rest between the top and bottom webs or facing members of the unit, substantially as indicated in Fig. 10 or, as will be described presently, comes to rest on the bottom web 3 before the top web is applied.

It is fully set forth in said copending application that the side edges of the building unit are grooved to make room between the facing members of the unit for the parts which are used in the assembly of unit sections and that for this purpose the central web 31 is made narrower than the top and bottom webs. It follows that the mandrels 13 and 50 should be of the same length as the width of the central web 31 and this feature is best shown in Figs. 10 and 12. It is also important to note that slightly conical studs 82 project from the bar 81 to come to rest within recesses 30ª and 50ª in the ends of the cleats 13 and 50.

Conduits 83, 84 lead from a suitable source of fluid under pressure to the ends of the cylinders 78 and valves should be provided for admitting pressure fluid to the cylinders thereby to project the bar 81 as aforesaid and again at the proper time withdrawing it. The rail 77, which supports the plate 65 of these cylinders, is moved into alignment with the portion of the unit which has first been completed and before it is moved into the heating section of the device. As shown in Figs. 10 and 11, a rack 85 is placed on one side of the track 76 and an electric motor 86 is mounted on the side of the carriage rail 77. This motor is fitted with a pinion 88 which is continuously in mesh with the rack 85 and which in any suitable manner (not shown) is connected to a source of energy and fitted with controlling means whereby the carriage rail may be moved back and forth on the track, as required during the process of producing the building unit.

As stated, the bars 81 are advanced at both sides of the unit to cause the studs 82 thereof to engage the recesses in the ends of the mandrels for the purpose of maintaining all of these parts in proper relative position to each other. It is now seen that it is merely required to move these carriages along the tracks 76 in order to bring the completed portion of the unit into correct position relative to the heating elements 72 and 73, in which position the parts remain standing until the polymerization process is completed. It may be found advisable, in addition, to apply heat to all of the mandrels during this heating period in order that the heat may be uniformly applied to the inner surfaces of the unit as well as to the outer surfaces thereof. As a simple means of illustrating this feature, I have, in Fig. 13, shown each of the bars 81 fitted with a bus bar 94 which through the medium of resilient connections 91 is designed to carry current to elements 92 within the cleats 13 and 50. To this end each heating element 92 is fitted with a teat 93 which comes in contact with the resilient member 91 when the parts are pushed together.

It may also be found necessary to apply heat to the inner surfaces of the projecting portions of the upper and lower web. Heating elements 90 may, for this purpose, be mounted within the bar 81.

It was above stated that the bars 81 are caused to enter into the spaces between the laterally projecting upper and lower webs of the assembled unit for the purpose of insuring correct alignment of the mandrels. It may, however, be found preferable to advance the bars into this position before the third web is placed in position, as above explained.

In order to make certain that the bar clears the side edge of the web 3 during this advance movement, it may be found necessary slightly to elevate the bar and means should be embodied for this purpose. Illustrative of such means I have, in Fig. 10, shown a small piston 95 placed below the base plate 65 of the cylinders 78 and it is to be noted, as above stated, that this plate is pivotally secured to the rail 77 at 96. A conduit 97 leads into the bottom of this small cylinder and it carries pressure fluid which, when desired, will elevate the piston within the cylinder and thereby tilt the plate carrying the cylinders 78 to raise the bar 81 above the edge of the web 3. Once fully advanced, the bar is in the same manner lowered into correct position.

When the webs of the unit have been properly cured within the heating elements, the bars 81 are withdrawn therefrom and the carriages returned on their tracks to their initial position to serve properly to align another set of cleats for a subsequent unit assembling operation. When thereupon the unit which has been so assembled is moved along the track, it is seen that the completely cured unit is forced ahead into its final position on the platform ahead of the heating elements. When this position is reached, it becomes necessary to remove the mandrels from the cured unit and this may be done in the following manner.

The two frames 25 and 52 have previously been returned to their initial positions on the platform extensions 10 and 11 and they are, as above explained, maintained in correct parallel relation to each other by means of the fixed guides 12 and 51. These guides are, for this removal purpose, made tubular and mechanism is mounted therein for expelling the mandrels from the unit.

As the expelling mechanism may be the same for all of both sets of mandrels, it is thought sufficient to describe such mechanism in connection with one mandrel 13. As indicated in Fig. 14, a piston 100 is mounted in the rear end of a cylinder 101, which in turn is rigidly seated within the guide. A piston rod 102 extends from the piston to a head 103 at the other end of the cylinder. These heads take a position in alignment with the mandrel 13 and they are advanced thereinto by means of a hydraulic fluid which is admitted under pressure through a conduit 104 into the space behind the piston 100. It is to be understood, of course, that the movement of the piston and the head 103 is sufficient to push the mandrel 13 out of the unit and back into the correct position on the platform extension 10. A conduit 105 connects with the other end of the cylinder behind the head 103 and fluid is admitted under pressure through this conduit to return the piston to its initial position. For the purpose of facilitating expulsion of the mandrels, it may be found advantageous slightly to taper these elements.

After all the mandrels have been expelled from the finished portion of the unit and again caused to lodge between the guides 12 and 51, they may be picked up by the frames 25 and 52 and returned to the web 3 for a subsequent unit forming operation.

It is seen from the foregoing description that the bottom layer 3 is continuously fed through the machine and that the center and upper layers are intermittently severed from the rolls issuing from the tank. I wish it understood that these upper layers become combined with each other and the bottom layer to form a continuous, integral construction unit during the polymerization process of the resin.

It is the essence of the present invention to recite and illustrate the steps which are necessary gradually to combine the webs into a particular form of load bearing unit, as well as to show the essential structural features thereof. Having done this, it is believed within the purview of the designing engineer familiar with the present art to supply and embody examples of such conventional parts and structures which, for the sake of clearness, are herein omitted.

I claim:

1. In a machine for combining webs of material into a structural unit, a platform, resin impregnating devices, means feeding a web of material through said impregnating devices to said platform, a series of guides rigidly mounted on the platform, a set of mandrels held in correctly spaced relation to each other in said guides, means transporting said mandrels to a position on the portion of the web deposited on the platform, a resin impregnating device movable on the platform, means feeding a web of material through said impregnating device and depositing the web on top of said mandrels during forward movement of the device, means for cutting the web at the end of its forward movement, a second set of guides on the platform, a second set of mandrels held in said guides in correctly spaced relation to each other, means transporting said second set of mandrels to the web deposited on the first set of mandrels, means associated with said transporting means adapted to depress the said second set of mandrels thereby to force said second web into the spaces between the first set of mandrels, means advancing a third web of material through the said movable impregnating device and for depositing said web on the said second set of mandrels during the forward movement of said device, and for depositing said web on the said second set of mandrels during the forward movement of said device, means for cutting the said third web at the end of the forward movement thereof, and means for heating the combined webs to cause the impregnated material thereof to become cured together to produce an integral unit.

2. In a machine for combining webs of material into a structural unit, a platform, resin impregnating devices, means feeding the web of material through said impregnating devices to said platform, a series of guides rigidly mounted on the platform, a set of mandrels held in correctly spaced relation to each other in said guides, means transporting said mandrels to a position on the portion of the web deposited on the platform, a resin impregnating device movable on the platform, means feeding a web of material through said impregnating device and depositing the web on top of said mandrels during forward movement of the device, means for cutting the web at the end of its forward movement, a second set of guides on the platform, a second set of mandrels held in said guides in correctly spaced relation to each other, means transporting said second set of mandrels to the web deposited on the first set of mandrels, means associated with said transporting means adapted to depress the said second set of mandrels thereby to force said second web into the spaces between the first set of mandrels, means advancing a third web of material through the said movable impregnating device and for depositing said web on the said second set of mandrels during the forward movement of said device, means for cutting the said third web at the end of the forward movement thereof, means for heating the combined webs to cause the impregnated material thereof to become cured together to produce an integral unit, and means for withdrawing said two sets of mandrels from the finished unit and returning them to their initial positions on the platform.

3. A machine for combining webs of material into a structural unit, a platform, impregnating devices, means feeding webs of material through said impregnating devices on to and along said platform, sets of mandrels on the platform, means placing said mandrels between the webs of material as they are delivered on to the platform, each of said mandrels being internally fitted with a heating coil, heating devices above and below the path of travel of the webs, means feeding the assembled web into a position between said heating devices, current conducting means movable to engage the ends of said mandrels to complete the circuit through the heating coils therein, and means for withdrawing the mandrels from the finished unit and returning them to their initial positions on the platform.

4. In a machine for combining webs of material into a structural unit, a platform, means feeding webs of material to and along said platform, guides on the platform, two sets of mandrels held in correctly spaced relation to each other between said guides, means for transporting the said sets of mandrels to positions between the layers of webs deposited on the platform, means associated with said transporting means applying pressure to said mandrels for correctly shaping and spacing the webs apart, carriages movable along the said edges of the platform, locating members on said carriages, means on the carriages for advancing said locating members into the ends of the mandrels, heating devices above and below the path of travel of the webs, means for moving said carriages and the said locating devices to advance the mandrels and the webs encompassing the mandrels into the said heating devices, and means for withdrawing the mandrels from the finished unit and returning them to their initial positions on the platform.

5. In a machine for combining webs of material into a structural unit, a platform, means for feeding webs of material to said platform, recessed mandrels on the platform, means for successively moving said series of mandrels between the said webs for correctly shaping and spacing the webs as they are delivered to the platform, means for heating the combined webs to cause the material thereof to become cured to produce an integral unit, means engaging the recesses of said mandrels and movable to transfer the unit to said heating means, and means for withdrawing the mandrels from the unit and returning them to their initial positions on the platform.

6. In a machine for combining webs of material into a structural unit, a platform, resin impregnating devices, means for feeding webs of material through said impregnating devices to the said platform, means applying pressure to the webs as they emerge from said impregnating devices to remove excess accumulation of resin therefrom, sets of mandrels on the platform, means for placing said sets of mandrels successively between the impregnated webs for correctly shaping and spacing the webs as they are delivered to the platform, means for heating the combined webs to cause the impregnated material thereof to become cured by polymerization of the resin to produce an integral unit, and means for withdrawing said web spacing and shaping means and returning them to their initial positions on the platform.

7. In a machine for combining webs of material into a structural unit, a platform, two sets of mandrels, guides on the platform for maintaining the mandrels of both sets in correctly spaced parallel relation to each other, means feeding webs of material to said platform, means for successively transporting the two sets of mandrels to the webs as they are deposited on the platform for the purpose of properly forming and spacing the webs relative to each other, heating devices, above and below the path of travel of the webs a carriage including elements engaging the mandrels for advancing the webs in this manner assembled into said heating devices to cause the material of the webs to become cured to produce an integral unit, and means for withdrawing the two sets of mandrels from the finished units and returning them to their initial positions on the platform.

8. In a machine for combining webs of fibrous resin impregnated material into a structural unit, a platform, resin impregnating devices, means for feeding webs of material through said impregnating devices to said platform, means applying pressure to the webs as they emerge from said impregnating devices to remove excess accumulation of resin therefrom, a set of mandrels mounted on the platform, magnetic means for raising and depositing said mandrels on the web first deposited on the platform, a second set of mandrels on the platform, magnetic means for raising and moving said second set of mandrels to a position between the webs of material deposited on the first named set of mandrels for correctly shaping and spacing the webs as they are delivered to the platform, means for heating the combining webs to cure the material thereof to produce an integral unit, and means for withdrawing said mandrels from the unit and returning them to their initial positions.

9. In a panel forming machine, a platform, means for feeding webs of resin impregnated material to said platform, a set of parallel guides at each side of the platform, mandrels resting within the spaces between adjacent guides of each set, a frame above each set of mandrels, magnets on said frames for raising the mandrels clear of the guides, and means for transporting the mandrel carrying frames to deposit the mandrels thereof into positions between said webs of material.

10. In a panel forming machine, a platform, means for feeding webs of resin impregnated material to said platform, a set of parallel guides at each side of the platform, mandrels resting within the spaces between adjacent guides of each set, a frame above each set of mandrels, magnets on said frames for raising the mandrels clear of the guides, means for transporting the mandrel carrying frames to deposit the mandrels thereof into positions between said webs of material, a heat element in the platform, a second heat element directly above said first named element, means for moving the combined mandrels and webs to a position between said heat elements for polymerization of the webs into a single unit, and means for extracting the mandrels from the completed unit.

11. In a panel forming machine, a platform, means for feeding webs of resin impregnated material to said platform, a set of parallel guides at each side of the platform, mandrels resting within the spaces between adjacent guides of each set, a frame above each set of mandrels, magnets on said frames for raising the mandrels clear of the guides, means for transporting the mandrel carrying frames to deposit the mandrels thereof into positions between said webs of material, a heat element in the platform, a second heat element directly above said first named element, means for moving the combined mandrels and webs to a position between said heat elements for polymerization of the webs into a single unit, and means for extracting the mandrels from the completed unit, the extracted mandrels being picked up by the magnets on the frames and returned to their positions within said guides.

12. In a machine for combining webs of material into a structural unit, a platform, two sets of mandrels, guides transversely mounted on the platform for maintaining the mandrels of each set in correctly spaced parallel relation to each other, means for successively depositing three webs of fibrous material on said platform, means for transferring one set of said mandrels to a position transversely of the web first deposited on the platform, means for transferring a second set of mandrels to a position between the second and third web as they are deposited on the platform in vertical alignment with the spaces between the first named mandrels, means forcing said second set of mandrels downward to push said second web into the spaces between the first set of mandrels thereby properly to shape the second web, heating devices above and below the path of travel of the webs on the platform, means for advancing the webs in this manner assembled about the mandrels into the space between said heating devices, means for lowering said upper heating device to apply pressure to the webs, heat from said devices causing the material of the webs to become cured together to produce an integral unit, and means for withdrawing the two sets of mandrels from the finished unit and returning them to their initial positions on the platform.

13. In a machine for combining webs of material into a structural unit, a platform, means for depositing a web of material on said platform, two sets of mandrel assemblies held on the platform in parallel uniformly spaced relation to each other, means for transferring one assembly of said mandrels to a position on the web deposited on the platform, the said web feeding means being movable to deposit a second web on top of the mandrel assemblies deposited on the first web, means for transferring the said second assembly of mandrels to a position on said second web in vertical alignment with the spaces between the first named mandrels, the web feeding means being movable to deposit a third web on top of said second set of mandrels, means for heating the combined webs to cause the material thereof to become cured thereby to produce an integral unit, means for moving the assembled webs into said heating means, and means for withdrawing the mandrels from the heat cured unit.

14. In a machine for forming a structural member, a platform, means for depositing a first web of material upon said platform, a first set of mandrels, means for placing the mandrels of said first set in spaced relation to one another directly on said first web of material, means for depositing a second web of material over said mandrels of said first set, a second set of mandrels, means for placing the mandrels of said second set over the spaces intermediate said mandrels of said first set, means for successively forcing the mandrels of said second set into the spaces between the mandrels of said first set and onto said second web simultaneously thereby forming said second web over said first set of mandrels and said second set of mandrels, and means for depositing a third web over said mandrels.

15. In a machine for forming a structural member, a platform, means for depositing a first web of material upon said platform, a first set of mandrels, means for placing the mandrels of said first set in spaced relation to one another directly on said first web, means for depositing a second web of material over said mandrels of said first set, a second set of mandrels, means for placing the mandrels of said second set over the spaces intermediate the mandrels of said first set, means for successively forcing the mandrels of said second set onto said second web and into the spaces between the mandrels of said first set simultaneously thereby forming said second web over said first mandrels and said second mandrels, means for applying pressure to said mandrels and said webs of material, and means for heating said webs of material.

16. In a machine for forming a structural member, a platform, means for depositing a first web of material upon said platform, a first set of mandrels, means for placing the mandrels of said first set in spaced relation to one another directly on said first web, means for depositing a second web of material over said mandrels of said first set, a second set of mandrels, means for placing said second set of mandrels over the spaces intermediate the mandrels of said first set, means for successively forcing said mandrels of said second set onto said second web and into the spaces between the mandrels of said first set simultaneously thereby forming said second web over said first mandrels and said second mandrels, means for applying pressure to said mandrels and said webs of material, means for heating said webs of material, and means for withdrawing said first set and said second set of mandrels from said webs of material.

CARROL C. SACHS.

REFERENCES CITED

The following references are of record in the file of this patent:

UNITED STATES PATENTS

| Number | Name | Date |
|---|---|---|
| 1,887,944 | Pullen | Nov. 15, 1932 |
| 2,300,760 | Amigo | Nov. 3, 1942 |
| 2,406,051 | Weiss | Aug. 20, 1946 |
| 2,414,177 | Smith | Jan. 14, 1947 |
| 2,423,870 | Blessing | July 15, 1947 |
| 2,433,965 | Upson | Jan. 6, 1948 |
| 2,445,290 | Gonda | July 13, 1948 |
| 2,454,719 | Scogland | Nov. 23, 1948 |

FOREIGN PATENTS

| Number | Country | Date |
|---|---|---|
| 545,090 | Great Britain | May 11, 1942 |